US006502238B1

(12) United States Patent
Pavan et al.

(10) Patent No.: US 6,502,238 B1
(45) Date of Patent: Dec. 31, 2002

(54) SYSTEM FOR CONSTRUCTING AND DISTRIBUTING BLOCK-BASED FRAGMENTS

(75) Inventors: Allalaghatta Pavan, Roseville, MN (US); Deepak R. Kenchammana-Hosekote, Sunnyvale, CA (US); Nemmara R. Vaidyanthan, Edina, MN (US)

(73) Assignee: Honeywell International Inc.

( * ) Notice: Subject to any disclaimer, the term of this patent is extended or adjusted under 35 U.S.C. 154(b) by 0 days.

(21) Appl. No.: 09/224,367

(22) Filed: Dec. 31, 1998

(51) Int. Cl.$^7$ ................................. G06F 9/45
(52) U.S. Cl. ..................... 717/149; 709/201
(58) Field of Search .................... 717/5, 136, 137–150; 700/17, 18, 180, 185; 703/27, 28; 706/62, 919, 922, 934; 709/201

(56) References Cited

U.S. PATENT DOCUMENTS

| | | | | |
|---|---|---|---|---|
| 5,522,080 | A | * 5/1996 | Harney | 710/220 |
| 5,675,805 | A | 10/1997 | Boldo et al. | 717/6 |
| 5,729,676 | A | * 3/1998 | Inoue | 714/38 |
| 5,819,074 | A | * 10/1998 | Mangelsdorf | 703/15 |
| 5,848,291 | A | * 12/1998 | Milne et al. | 707/500.1 |
| 5,867,397 | A | * 2/1999 | Koza et al. | 703/14 |
| 5,926,644 | A | * 7/1999 | Hays | 712/22 |
| 6,212,562 | B1 | 4/2001 | Huang | 709/227 |

FOREIGN PATENT DOCUMENTS

| | | | |
|---|---|---|---|
| EP | 0710909 A | 5/1996 | G06F/9/44 |
| EP | 0780763 A | 6/1997 | G06F/9/46 |
| GB | 2304945 A | 3/1997 | G06F/3/033 |
| WO | 9824033 | 6/1998 | G06F/15/00 |

OTHER PUBLICATIONS

Adam, J.F., et al., "Experience with the VuNet: A Network Architecture for a Distributed Multimedia System", *IEEE*, pp. 70–76, (1993).

Anderson, D., et al., "Building Multiuser Interface Multimedia Environments at MERL", *IEEE, MultiMedia, 2(4)*, pp. 77–82, (1995).

Anderson, D.P., et al., "Support For Continuous Media In The Dash System", *Proceedings of the 10th International Conference on Distributed Computing Systems*, Paris, France, pp. 54–61, (Jun. 1990).

Arvind, K., et al., "A Local Area Network Architecture for Communication in Distributed Real–Time Systems", *The Journal of Real–Time Systems, 3* (2), pp. 115–147, (May 1991).

Chang, Y., et al., "An Open–Systems Approach to Video on Demand", *IEEE Communications Magazine, 32* (5), pp. 68–80, (May 1994).

(List continued on next page.)

*Primary Examiner*—Tuan Q. Dam
*Assistant Examiner*—Hoang-Vu Antony Nguyen-Ba
(74) *Attorney, Agent, or Firm*—Ian D. Mackinnon

(57) ABSTRACT

A distributed block-based programming model for control applications such as multimedia based real-time applications is described. According to one aspect of the invention, user program specifies interconnections between a plurality of program blocks distributed across a plurality of processing nodes. The user program is automatically translated into a system-level program having a program fragment for each one of the processing nodes. Each one of the program fragments comprise the program blocks located on the processing node and one or more system-level blocks for establishing connections between the processing node and a different processing node across a network.

23 Claims, 14 Drawing Sheets

OTHER PUBLICATIONS

Ferrari, D., "Client Requirements for Real–Time Communication Services", *IEEE Communications Magazine, 28* (*11*), pp. 65–72, (Nov. 1990).

Gemmell, D.J., "Multimedia Network File Servers: Multi–channel Delay Sensitive Data Retrieval", *Proceedings of ACM Multimedia*, Anaheim, California, pp. 243–250, (Aug. 1993).

Gemmell, D.J., et al., "Multimedia Storage Servers: A Tutorial", *IEEE Computer*, pp. 40–49, (May 1995).

Guha, A., et al., "Controlling the Process with Distributed Multimedia", *IEEE Mulimedia, 2*(*2*), pp. 20–29, (1995).

Haeberli, P.E., "ConMan: A Visual Programming Language for Interactive Graphics", *Computer Graphics, 22* (*4*), pp. 103–111, (Aug. 1988).

Huang, J., et al., "Integrated System for Continuous Multimedia Applications", *Proceedings of the IASTED/ISMM International Conference, Distributed Multimedia Systems and Applications*, Hawaii, pp. 229–232, (1994).

Huang, J., et al., "On Supporting Mission–Critical Multimedia Applications", *Proceedings of the International Conference on Multimedia Computing and Systems*, Hiroshima, Japan, pp. 46–53, (1996).

Huang, J., "Real–Time Support for Multimedia in Distributed Time Critical Environments",*The 4th Annual International Workshop on Network and Operating System Support for Digital Audio and Video*, Lancaster, U.K., pp. 1–4, (Oct. 1993).

Huang, J., et al., "Resource Management for Continuous Multimedia Database Applications", *Proceedings Real–Time Systems Symposium*, San Juan, Puerto Rico, pp. 46–54, (1994).

Huang, J., et al., "The Mercuri Multimedia Laboratory at Honeywell", *IEEE Multimedia, 3*(*2*), pp. 72–77, (1996).

Huang, J., et al., "Tutorial: Real–Time Scheduling Technology for Continuous Multimedia Applications", *3rd ACM Multimedia Conference*, San Francisco, pp. 1–82, (1995).

Kenchammana–Hosekote, D., et al., "Efficient Storage for Synchronized Digital Audio and Video", Technical Paper TR95–28, Department of Computer Science, University of Minnesota, pp. 1–8, (1995).

Kenchammana–Hosekote, D., et al., "Scheduling Continuous Media in a Video–On–Demand Server", *Proceedings of the International Conference on Multimedia Computing and Systems*, Boston, Mass., pp. 19–28, (1994).

Kenchammana–Hosekote, D.R., et al., "A QoS Based Scheduling Algorithm for Continuous Media Servers", Technical Report TR95–28, Department of Computer Science, University of Minnesota, pp. 1–17, (1995).

Kenchammana–Hosekote, D.R., et al., "Designing an I/O Scheduler for Continuous Media", *Communications of IEEE Technical Group on Multimedia Computing*, pp. 1–22, (1994).

Kenchammana–Hosekote, D.R., et al., "I/O scheduling for digital continuous media", *Multimedia Systems, 5*, pp. 213–237, (1997).

Kenchammana–Hosekote, D.R., et al., "Retrieval Techniques for Compressed Video Streams", *SPIE, 2667*, pp. 398–409, (1996).

Lindblad, C.J., et al., "The VuSytem: A Programming Sytem for Compute–Intensive Multimedia", *IEEE Journal on Selected Areas in Communications, 14*(*17*), pp. 1298–1313, (1996).

Lougher, P., et al., "The Design and Implementation of a Continuous Media Storage Server", *Proceedings of the Third International Workshop on Network and Operating System Support for Digital Audio and Video*, La Jolla, California, P.Venkat Rangan (Ed.) Springer–Verlag, pp. 69–80, (Nov. 1992).

Mizunuma, I., et al., "Middleware for Distributed Industrial Real–Time Systems on ATM Networks", *IEEE*, pp. 32–38, (1996).

Prabhakar, S., et al., "Research Issues in Distributed Multimedia Database Management", *COMAD Conference*, India, pp. 1–12, (1992).

Ramakrishnan, K.K., et al., "Operating system support for a video–on–demand file service", *Multimedia Systems, 3*, pp. 53–65, (1995).

Stewart, D.B., et al., "Design of Dynamically Reconfigurable Real–Time Software Using Port–Based Objects", *IEEE Transactions on Software Engineering, 23*(*12*), pp. 759–776, (1997).

Vogel, A., et al., "Distributed Multimedia and QOS: A Survey", *IEEE Multimedia, 2* (*2*), pp. 10–19, (1995).

Wetherall, D.J., "An Interactive Programming System for Media Computation", Laboratory for Computer Science, Massachusetts Institute of Technology, pp. 1–104, (1994).

\* cited by examiner

| | | |
|---|---|---|
| 1 | 0 ICamera_p | |
| 2 | 1 ICamera_p | |
| 3 | 2 IS_p | |
| 4 | 3 P_p | |
| 5 | 4 Qdisplay_p | |
| 6 | 8 Slider_p | |
| 7 | 9 Chart_p | |
| 8 | 10 Chart_p | |
| 9 | 12 Chart_p | |
| 10 | 13 Chart_p | |
| 11 | -1 NoBlock | |
| 12 | 2 VideoOutput1 | 3 VideoInput1 |
| 13 | 2 VideoOutput2 | 3 VideoInput2 |
| 14 | 0 Output | 2 VideoInput1 |
| 15 | 0 CompQF | 12 Input |
| 16 | 8 Output | 0 QF |
| 17 | 1 Output | 2 VideoInput2 |
| 18 | 1 CompQF | 13 Input |
| 19 | 3 QFactor | 1 QF |
| 20 | 3 VideoOutput | 4 Input |
| 21 | 4 QFactor | 9 Input |
| 22 | 4 FrameSize | 10 Input |
| 23 | -1 NoPort | -1 NoPort |
| 24 | NoExposedPort | -1 -1 |
| 25 | Cam0Loc | 0 Location |
| 26 | Cam1Loc | 1 Location |
| 27 | ISLoc | 2 Location |
| 28 | PLoc | 3 Location |
| 29 | DispLoc | 4 Location |
| 30 | Slid0Loc | 8 Location |
| 31 | SC3Loc | 9 Location |
| 32 | SC3Title | 9 Title |
| 33 | SC4Loc | 10 Location |
| 34 | SC4Title | 10 Title |
| 35 | SC6Loc | 12 Location |
| 36 | SC6Title | 12 Title |
| 37 | SC7Loc | 13 Location |
| 38 | SC7Title | 13 Title |
| 39 | NoParameterPort | -1 -1 |

*FIG. 2A*

| | | |
|---|---|---|
| 40 | Cam0Loc | Node A |
| 41 | Slid0Loc | Node A |
| 42 | SC6Loc | Node A |
| 43 | Cam1Loc | Node B |
| 44 | SC7Loc | Node B |
| 45 | ISLoc | Node C |
| 46 | PLoc | Node C |
| 47 | DispLoc | Node D |
| 48 | SC3Loc | Node D |
| 49 | SC4Loc | Node D |
| 50 | NoParameter NoValue | |
| 51 | -1 NoFile | |

*FIG. 2B*

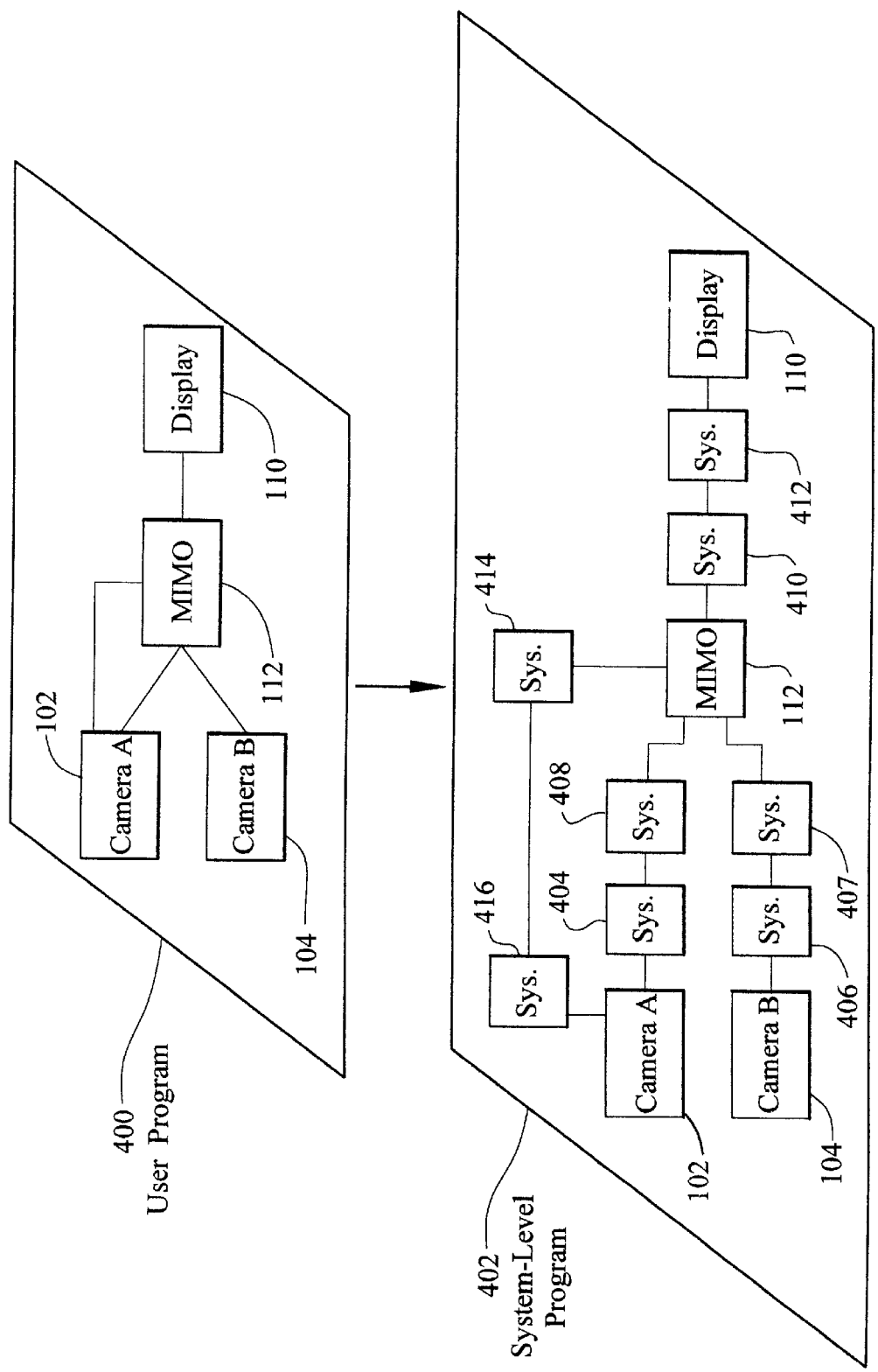

SYSTEM FOR CONSTRUCTING AND DISTRIBUTING BLOCK-BASED FRAGMENTS

STATEMENT OF GOVERNMENT INTEREST

This invention was made with Government support under contract number F19628-94-C-0044 awarded by Advanced Research Projects Agency (ARPA)/CSTO. The Government has certain rights in the invention.

FIELD OF THE INVENTION

The present invention relates generally to control system applications and more specifically to a system for constructing and distributing block-based program fragments for use in such applications.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright © 1998, Honeywell, Inc., All Rights Reserved.

BACKGROUND OF THE INVENTION

Multimedia is increasingly recognized as an enabling technology with diverse applications from interactive training to medical diagnosis, for example. However, the use of multimedia in control applications has received little attention. A driving force behind the inclusion of multimedia in control applications is the need for sensing higher order material and product properties. In high value added processes such as composite synthesis and semiconductor manufacturing, higher order material and product properties such as look, feel, consistency, and uniformity serve as quality measures for control. Many such property measurements can be inferred by correlating the outputs of multimedia sensors.

In the context of control applications, the term "multimedia" implies a much broader scope than the traditional usage of the term that refers to audio, video and text. In the context of control applications, multimedia encompasses both image data and spectral data. Image data refers to still images, full-motion video, voice, graphics and text data. Image data is obtained from sources such as video, X-ray, and scanning electron microscopy to name a few. Spectral data refers to sensor data. Spectral data is obtained from sources such as infrared, color, acoustic emission, ultrasound, microwave, laser, and other optical devices, for example.

Examples of areas in which control applications using multimedia information can improve product yield and quality include: advanced composite materials, semiconductors, metal processing, pulp and paper industry, petroleum and refining, and virtual reality. Multimedia information is used in such control applications in many ways. For example, multimedia information is used for direct and indirect measurements of quality, as a means of improving process alarm management, and for implementing more effective control strategies such as Multiple-Input Multiple-Output (MIMO) control. In particular, MIMO control using multimedia and spectral sensor data allows control systems to operate on higher level, often intangible, properties of a product such as look, feel, and sound.

A MIMO control strategy refers to the simultaneous processing of multiple sensors (inputs) and actuators (outputs) to provide globally optimal control. This requires that multiple inputs and outputs be synchronized within specified time constraints and in turn places more performance demands on the underlying network. Due to processing and communications limitations, MIMO implements are used currently only for small processes.

What is needed is a network architecture that will support distributed control systems that will operate directly on multimedia data. What is also needed is a programming model for multimedia based MIMO control applications.

SUMMARY OF THE INVENTION

A distributed block-based programming model is described. According to one aspect of the invention, a user program is received. The user program specifies interconnections between a plurality of program blocks distributed across a plurality of processing nodes. The user program is translated into a system-level program having a program fragment for each one of the processing nodes. Each one of the program fragments comprise the program blocks located on the processing node and one or more system-level blocks for establishing connections between the processing node and a different processing node across a network.

According to another aspect of the invention, a user program specifying connections between a plurality of program blocks distributed across a plurality of processing nodes is received. At least one program block located on a root processing node is identified. The root node is the processing node controlling execution of the program. The input and output connections from each one of the program blocks located on the root node are traced. Connection between one of the program blocks located on the root processing node and one of the program blocks located on a remote processing node are identified. A first system-level block is inserted on the root processing node. A second system-level block is inserted on the remote node. The first and second system-level blocks provide network services. A program fragment is created for the processing nodes. The program fragment for each processing node comprises the program blocks and the system-level blocks located on the processing node.

Therefore, one aspect of the present invention provides a method of automatically creating and executing distributed programs based on a block based programming model. Another aspect of the invention provides centralized control for the distributed application. Still other and further embodiments, aspects and advantages of the invention will become apparent by reference to the drawings and by reading the following detailed description.

BRIEF DESCRIPTION OF THE DRAWINGS

FIGS. 2A and 2B are an example high level user program for the example logical construct shown in FIG. 1.

FIG. 4 is a functional block diagram of the mapping of the example user program of FIGS. 2A and 2B to an example of a system-level program having a program fragment for each one of the processing nodes shown in FIG. 3.

DESCRIPTION OF THE EMBODIMENTS

Figure 1:
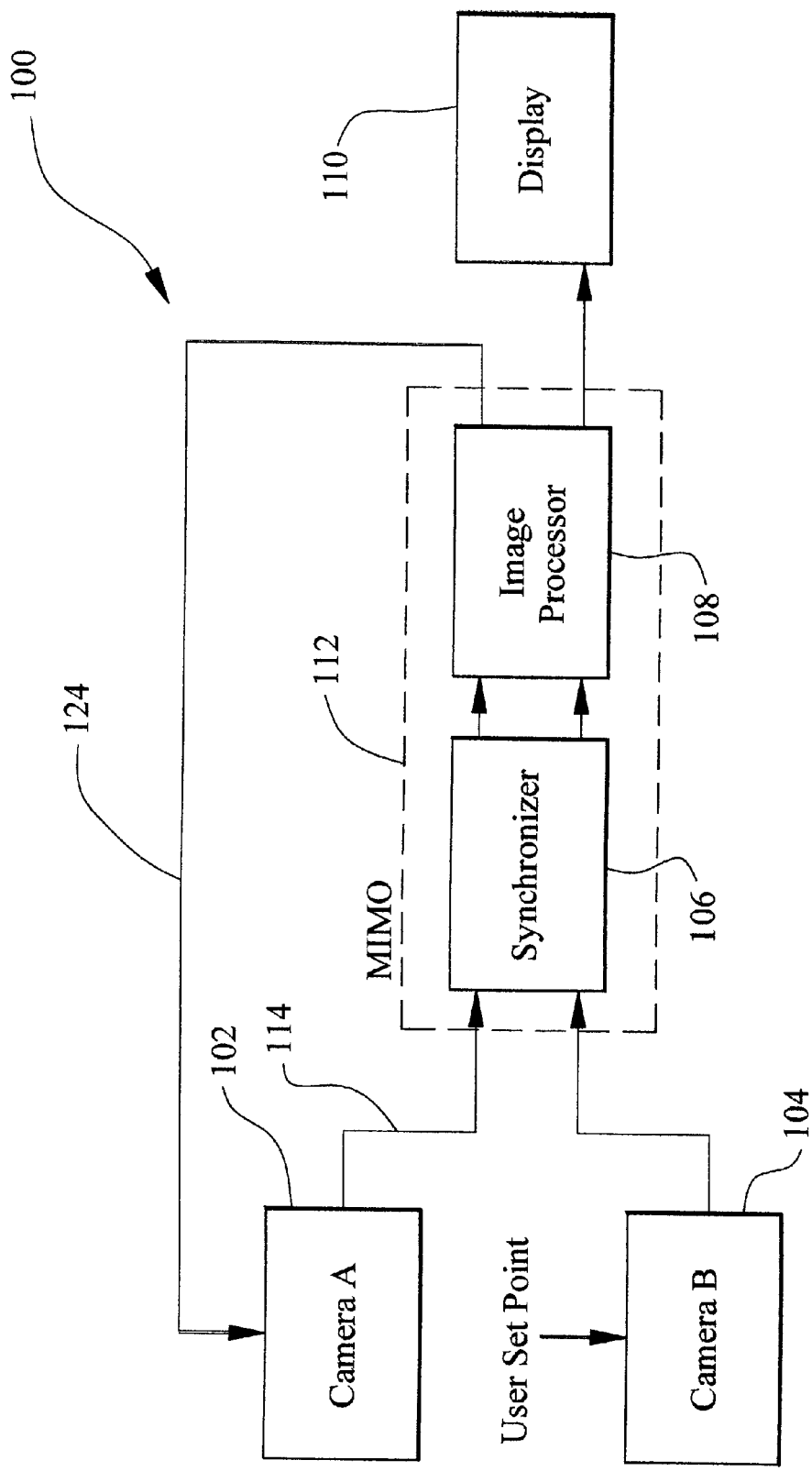
FIG. 1 is an illustration of an example logical construct for a distributed block-based programming environment.

In the following detailed description of the embodiments, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present inventions. The following detailed description is, therefore, not to be taken in a limiting sense, and the scope of the present inventions is defined only by the appended claims.

Introduction. The system of the present invention is implemented with a distributed blocked-based programming model as further described below. A blocked-based program for displaying images recorded by a video camera on a display is used as an example through out this application. The system of the present invention reads in a high-level block-based user program specifying interconnections between program blocks distributed across a network of processing nodes. The processing node controlling the execution of the program is referred to herein as the "root node." The system identifies the program blocks located on the root node. The system traces the input and output connections from each program block on the root node. The system detects connections to program blocks on nodes other than the root node (referred to here in as "remote nodes") and inserts blocks into the program that establish network connections between the program blocks. For each node, the system produces a system-level program fragment comprising all of the blocks located on the node that are required for the system-level program to execute. The system is also capable of detecting feedback loops in the program and avoiding livelock and deadlock.

The detailed description of this invention is divided into four sections. The first section describes a distributed block-based application programming model in conjunction with which embodiments of the present invention are implemented. The second section provides an overview of one embodiment of a system for constructing and distributing block-based program fragments. The third section describes the functional specifications for one embodiment of the invention for constructing program fragments. The fourth section illustrates the data flow for an example scenario.

Distributed Block-Based Application Programming Model. The embodiments described in the present application are implemented in conjunction with a distributed block-based application programming model. A block is a high level program abstraction. Blocks can be implemented in any high level language. In an example embodiment, blocks are implemented in the C++ programming language with the use of C++ objects, utilizing notions of class definitions, instantiations and inheritance. It is not necessary, however, to implement blocks with objects. It is also not necessary to utilize an object oriented programming language.

A block is a high level encapsulation of a specific function inside a computer program. Examples of such functions in control systems include sensors (for example, an infrared camera, a temperature sensor, a thermostat, or a color sensor), and actuators (for example, a control valve or a display monitor). Blocks can represent functions performed by physical devices (such as in the examples above) or blocks can represent system level functions within the computer program that are hidden from a user (such as a network resource manager for example).

Blocks are logically categorized as primitive blocks and composite blocks. Primitive blocks are implemented in a system programming language. Primitive blocks usually encapsulate a single and simple function. Composite blocks are collections of primitive blocks to provide higher order functions. An example of a composite block is a motion activated camera that comprises a primitive camera block and a primitive motion detection block linked together.

FIG. 1 is a block diagram of an example application 100 constructed with a block-based programming model. The example application 100 illustrates a logical construct in a distributed block-based environment. The example application 100 comprises a plurality of program blocks 102, 104, 106, 108, 110. The application is constructed by interconnecting the program blocks through ports to achieve a function desired by the user. The application in FIG. 1 displays on a display device video images captured by camera A and camera B.

In one embodiment, each one of the program blocks 102, 104, 106, 108, 110 is a pre-compiled and linked piece of code encapsulating a function (referred to herein as a "primitive" block.) Composite blocks (also referred to as "precomposed" blocks) are partially constructed programs made from one or more primitive blocks or other composite blocks. The example application 100 shown in FIG. 1 includes a multiple input multiple output (MIMO) composite block 112 constructed from two primitive blocks 106, 108.

Each one of the program blocks is logically characterized as a source block, a sink block or an intermediate block. A source block produces data. In an application for a control system, example source blocks represent cameras, infrared cameras, microphones, temperature sensors, pressure sensors, color sensors, laser sensors, optical sensors, disk drives, tape drives, memory, network monitoring devices such as an Ethernet sniffer and the like. A sink block consumes data. Example sink blocks represent displays, speakers, control valves, plotters, printers, disk drives, memory, tape drives, locking devices, brakes, throttles and the like. Between source and sink blocks are intermediate blocks that represent physical devices or software that perform various processing functions. Image recognition, thresholding, synchronization and flow control are examples of functions associated with intermediate blocks. Additional intermediate blocks comprise any device or software that processes or transforms data. As will be readily apparent to one of skill in the art, these categories are not mutually exclusive. For example, a disk storage system is capable of being represented as either a source block when data is read from the disk or as a sink block when data is written to the disk. In the example application shown in FIG. 1, camera A 102 and camera B 104 are represented by source blocks; display 110 is represented by a sink block; and synchronizer 106 and image processor 108 are represented as intermediate blocks.

The program blocks are interconnected through one or more ports. A port is an interface of a program block that enables the exchange of data with other program blocks. Each port is characterized by a data type (JPEG video, audio, etc.), a data flow direction (input or output) and a control flow type (push or pull). Each one of the program blocks 102, 104, 106, 108, 110 has one or more ports.

An application in a blocked-based programming model can have one or more feedback loops (also referred to as cycles). In the example application 100 a feedback loop exists between the camera A program block 102 and the MIMO program block 112. Data flows from the camera A program block 102 to the MIMO program block 112 through connection 114 and feedback data is returned to the camera A program block 102 through connection 124. Feedback loops are common in applications that perform process control.

FIGS. 2A and 2B are an example embodiment of a high level user program for the example application 100 shown in FIG. 1. A user creates a program from a library of primitive and composite blocks. The user composes the program by specifying connections between output ports and input ports without regard to the location of the program blocks in the system or the compatibility of the port types. Such a program is referred to herein as a "user program." The user program shown in FIGS. 2A and 2B includes line numbers identifying each line of the program.

Lines 1–11 in FIG. 2A are declarations which assign an identification (ID) number t o the various program blocks used in the example application of FIG. 1. In this example, each declaration is read as follows: <Id Number> is assigned to <Program Block Name>. For example, at Line 1 of FIG. 2A an ID of zero (0) is assigned to the Camera A program block. At line 2 of FIG. 2A, an ID of one (1) is assigned to the Camera B program block. At line 3, an ID of two (2) is assigned to the input synchronizer program block. At line 4, an ID of three (3) is assigned to the image processor program block. Likewise, at lines 5–10 ID numbers are assigned to various program blocks associated with the display. The end of the program block declarations is indicated at line 11.

Lines 12–24 in FIG. 2A define connections between ports of the program blocks declared in lines 1–11. In this example, the program blocks are referenced by the ID number assigned in the declarations section. Each line can be read as follows: for the program block identified by Id number <Id Number> connect the port <Port Name> to a port on the program block identified by Id number <Id Number> the port being <Port Name>. For example, line 12 specifies that for the program block identified by ID number two (2) (i.e. the input synchronizer program block) connect the port named "VideoOutput1" to a port on the program block with ID number three (3) (i.e. image processor program block) the port being "VideoInput1." Likewise, lines 13–22 specify other connections between program blocks. The end of the connection definitions is indicated at lines 23 and 24.

Lines 25–39 in FIG. 2A define symbolic names for the ports in the program blocks that will be used to indicate the locations of the various program blocks. In this example, each line is read as follows: define a port named <Port Name> for the program block identified by Id number <Id Number> the port being of type <Port Type>. For example, line 25 defines a port named "CamOLoc" for the program block with ID number zero (0) (i.e. Camera A program block) the port being of type "location". Similarly, lines 26–38 define ports for all of the other program blocks. The end of the definitions of ports is indicated at line 39.

Referring to FIG. 2B, lines 40–49 assign a host location for each one of the program blocks. In this example, each line is read as follows: for the location port <Port Name> assign the host location <Host Name>. For example line 40 is read as for the location port "CamOLoc" assign the host location "Node A." Similarly, lines 41–49 assign locations for other program blocks. Line 50 indicates the end of the declarations. Line 51 indicates the end of the file.

The example user program shown in FIGS. 2A and 2B allows a user to specify connections between program blocks using any commonly available script language and/or graphical user interface. The user does not have to write program code; instead, the user creates a program by merely specifying connections between output ports and input ports on program blocks. As further described below, a system-level program is automatically created from a user program such as the user program shown in FIGS. 2A and 2B.

System Overview. This section provides an overview of one embodiment of a system for constructing and distributing block-based program fragments. First, the system reads in a high-level user program, such as the user program in FIGS. 2A and 2B. The high-level user program specifies interconnections between program blocks distributed across a network of processing nodes. The system identifies the program blocks located on the root node and the system traces the input and output connections from each program block on the root node. If the system detects a connection to a program block located on a remote node, the system inserts intermediate blocks into the program for establishing connections between the program blocks located on different nodes across the network. Such intermediate blocks are further described below. For each node, the system produces a program fragment comprising all of the program blocks located on the node that are required for the program to execute.

The intermediate blocks are capable of providing services that the program needs to execute such as establishing connections between the program blocks located on different nodes across the network, managing resources or facilitating data transfer between program blocks distributed across a network. Additional services provided by intermediate blocks include resource reservation (e.g. CPU, Network Bandwidth, Memory, Disk), synchronization, resource scheduling, and inter-node communication. Such intermediate blocks are referred to herein as "system-level blocks." The system-level blocks are inserted by the present invention when translating a user program, such as the user program shown in FIGS. 2A and 2B, to a system-level program. The translation process resolves any connection conflicts that exist in the user program. One type of connection conflict is a location mismatch where the program blocks specified in the user program reside on different computing nodes distributed across the network as described next with respect to FIG. 3.

Figure 3:
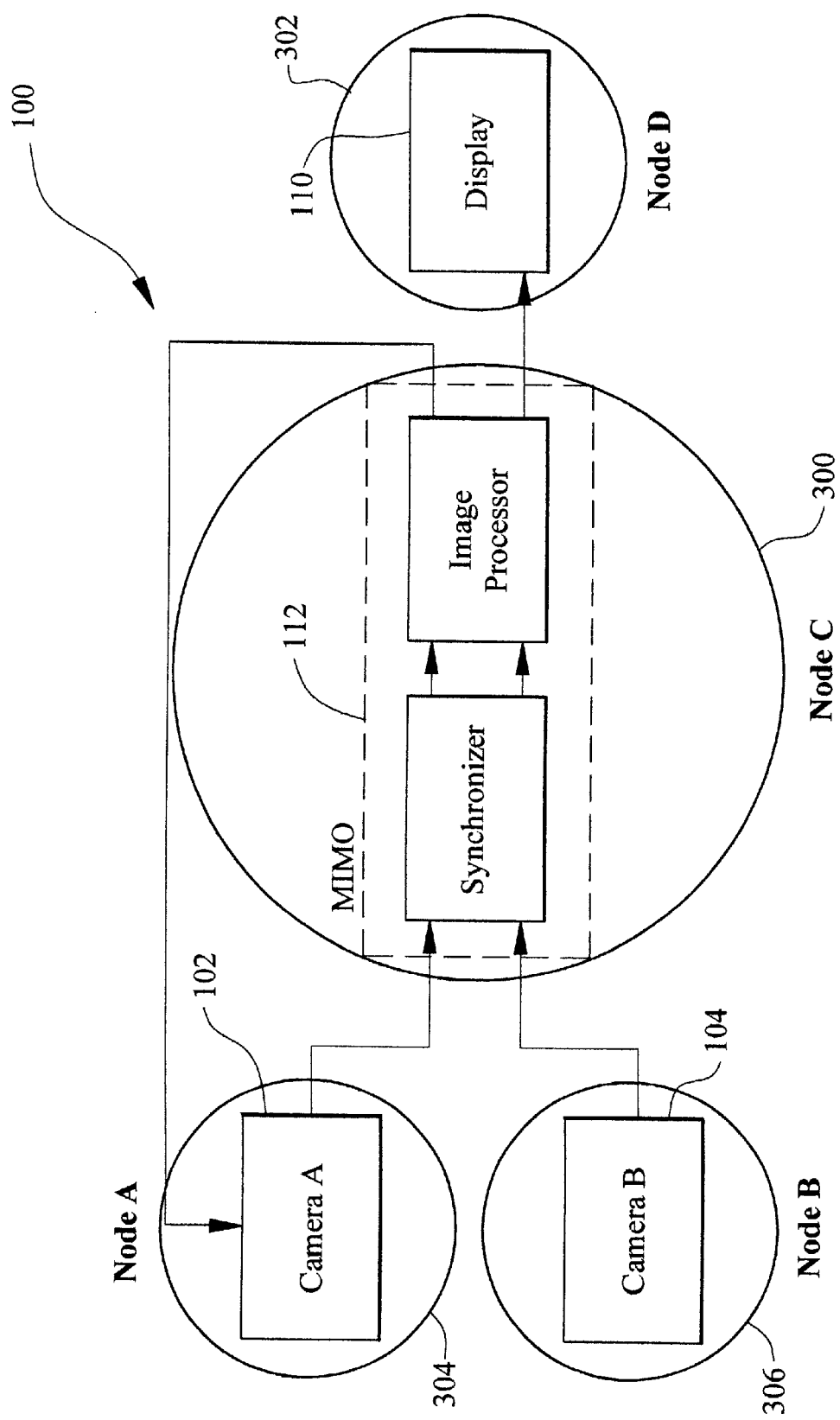
FIG. 3 is a block diagram indicating a processing node location for each block comprising the example logical construct shown in FIG. 1.

FIG. 3 is a block diagram indicating a computing node location for each one of the program blocks comprising the application shown in FIG. 1. The program blocks reside on different computing nodes distributed across the network.

Each one of the computing nodes is a computer or processor. Connections between computing nodes are implemented through standard local area networks, wide area networks or any other remote communication infrastructure used to transfer data. As shown in FIG. 3, the composite block 112 is located on node C 300. The display program block 110 is located on node D 302. The camera A program block 102 is located on node A 304 and the camera B program block 104 is located on node B 306.

The system locates the program blocks at remote sites and establishes connections across the network. One or more system-level blocks are inserted into the system-level program in order to establish network connections. In this example, the system detects that the program blocks specified in the user program are distributed across node C 300, node D 302, node A 304 and node B 306.

The system translates the user program to a system-level program and creates a program fragment for each one of the nodes 300, 302, 304 and 306 that has a program block specified in the user program. The program fragment for each node comprises the program block originally located on the node and one or more system-level blocks for providing any services needed for the program block to communicate with other program blocks distributed across the network.

In one embodiment, the method of constructing and distributing block-based program fragments is incorporated into software executing on a computer. As described below, the software program constructs the desired application by resolving connection conflicts between distributed program blocks specified in the user program and inserting the necessary system-level blocks in the system-level program. In one embodiment, the software executes under an operating system such as Solaris 2.5 or the like and executes on an industry-standard workstation such as a Sun SPARCstation 20 or the like. The software program is developed using any high level language having programming constructs to support blocks. In an example embodiment, the software is developed using the C++ programming language. A user interface for allowing the user to create user programs by selecting program blocks from a block library is implemented with any common graphical user interface such as Xviews or the like.

Separation of the user program from the corresponding system-level program makes the distributed block interactions transparent to the user or application programmer. Therefore, the present invention simplifies block-based programming.

Constructing Program Fragments. This section describes functional specifications for one embodiment of the present invention that creates and distributes program fragments.

FIG. 4 is a functional block diagram of the mapping of a user program 400 for the control system application shown in FIG. 1 to a corresponding system-level program 402 having program fragments. In the example shown in FIG. 4, the user program 400 describes the interconnection between the camera A program block 102, the camera B program block 104, the MIMO program block 112 and the display program block 110. Each one of the program blocks 102, 104, 110, 112 is located on different a computing node distributed across a network as shown in FIG. 3.

The system of the present invention translates the user program 400 to the system-level program 402. The system-level program 402 comprises each one of the program blocks 102, 104, 110, 112 specified in the user program as well as system-level blocks 404, 406, 407, 408, 410, 412, 414, 416 inserted into the system-level program to make necessary network connections. The first system-level blocks 404, 416 are located on the same computing node (node A 304) as the camera A program block 102. The second system-level block 406 is located on the same computing node (node B 306) as the camera B program block 104. The third system-level blocks 407, 408, 410, 414 are located on the same computing node (node C 300) as the MIMO program block 112. The fourth system-level block 412 is located on the same computing node (node D 302) as the display program block 110.

As shown in FIG. 4, the system of the present invention translates the user program to a system-level program and creates a program fragment for each one of the nodes 300, 302, 304, 306 having a program block specified in the user program. The program fragment for each node comprises the program block originally located on the node and the system-level block or blocks exported to the node for providing any system-level services needed for the program block to communicate with other program blocks distributed across the network. For example, the program fragment for node C 300 shown in FIG. 4 comprises the MIMO program block 112 and four system-level blocks 407, 408, 410, 414. The program fragment for node D 302 comprises the display program block 110 and the system-level block 412. The program fragment for node A 304 comprises the camera A program block 102 and two system-level blocks 404, 416. The program fragment for node B 306 comprises the camera B program block 104 and the system-level block 406.

Referring now to FIGS. 5A, 5B, 6A, 6B, 6C, 6D, and 6E a particular method performed by a processor in an exemplary embodiment is described by reference to a series of flowcharts. The methods to be performed constitute computer programs made up of computer-executable instructions. The methods shown in FIGS. 5A, 5B, 6A, 6B, 6C, 6D, and 6E are implemented in a machine readable medium comprising machine readable instructions for causing a computer to perform the method. Such machine readable medium may include software modules and computer programs. The type of computer programming languages used to write the code may vary from procedural code type languages to object oriented languages. The files or objects need not have a one to one correspondence to the modules or method acts described depending on the desires of the programmer. Further, the method and apparatus may comprise combinations of software, hardware and firmware as is well known to those skilled in the art. Describing the methods by reference to flowcharts enables one skilled in the art to develop such programs including such instructions to carry out the methods on suitable computerized systems.

Figure 5A:
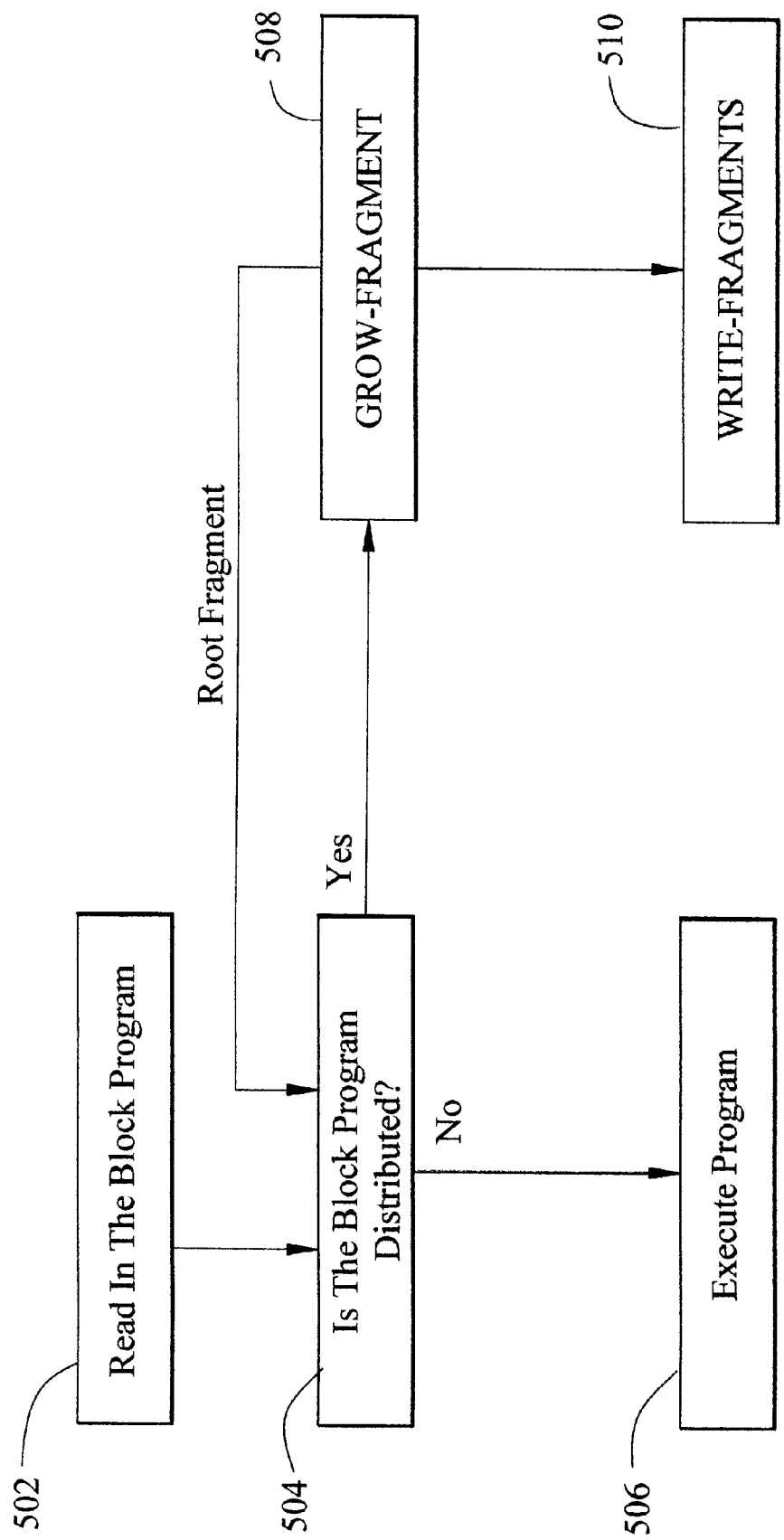
FIG. 5A is a high-level flowchart of one embodiment of a method of converting the user program of FIGS. 2A and 2B to a system-level program having program fragments as shown in FIG. 4.

FIG. 5A is a high-level flowchart of one embodiment of a method of translating a user program to a system-level program. The initial step "Read in the block program" 502 reads the user program file as input. The next step "Is the block program distributed?" 504 determines if the program blocks specified in the user program are located on a single processing node or are distributed across a network of processing nodes. If the program blocks are located on a single node then the step "Execute Program" 506 executes the user program. If the program blocks are distributed across a network, then the step "GROW_FRAGMENT" 508 detects program blocks located on different processing nodes and inserts one or more system-level blocks in the system-level program. The step "GROW_FRAGMENT" 508 constructs a program fragment (referred to herein as a fragment) for each node on which one or more program blocks reside. The fragment comprises the program blocks and the system-level blocks running on the node. After a fragment is constructed for a node, the fragment is written to the node in the step "WRITE_FRAGMENTS" 510. The processing node from which the user program is controlled is referred to as the control node. In one embodiment, the control node is the node on which the user program is submitted for execution. In addition to the fragment that is written to each remote node, a fragment (referred to herein as a root fragment) is written to the control node.

One type of system-level block inserted during the step "GROW-FRAGMENT" 508 is referred to herein as a communications block. The communications block is capable of transferring data between program blocks located on different hosts. The communications block facilitates communication between program blocks located on different nodes. For example, the communications block determines how data is transferred between hosts, how to handle unsuccessful transfers and how to recover when an error appears in the data when it crosses the network.

The standards and protocols involved in establishing network connections between different nodes are well known to one of skill in the art. Industry standard connections include Ethernet and ATM (Asynchronous Transfer Mode) for example. An example embodiment includes a communications block for sending TCP/IP data across Ethernet.

Four types of communications blocks exist: an input client block, an output client block, an input server block and an output server block. Communications blocks are inserted into the system-level program in client-server pairs to facilitate communication between program blocks distributed across the network. In the example system-level program 402 shown in FIG. 4, a pair of communications blocks 410, 412 is inserted in the system-level program between the MIMO program block 112 and the display program block 110. One of the communications blocks is a client block and the other is a server block. In an example scenario where the MIMO program block 112 is located on a root node and the display program block 110 is located on a remote node, the communications block 410 adjacent the MIMO program block 112 is an output client block and the communications block 412 adjacent the display block 110 is an input server block.

Additional examples of system level blocks include a network block and a network resource manager block. The network block multiplexes and demultiplexes the communication in and out of the client/server communications blocks located on each node. Every node in the application has exactly one network block for a given instance of the program execution environment. All applications running on a given node use the same network block. The network resource manager block is concerned with the allocation of network bandwidth to connections requested by various distributed application streams running over the network.

Figure 5B:
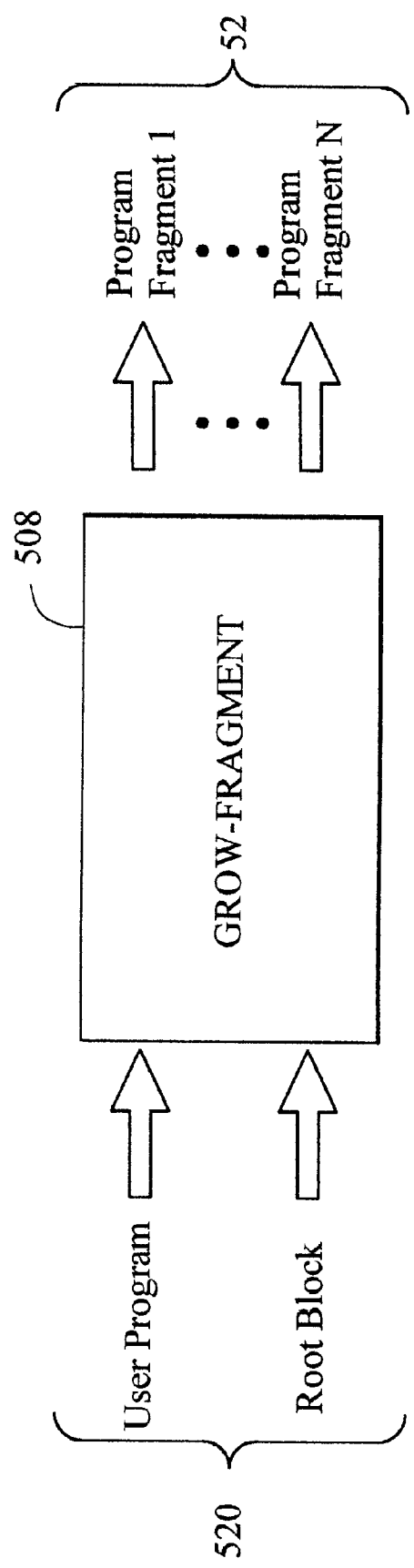
FIG. 5B is a diagram illustrating the inputs to and the outputs from the "GROW-FRAGMENT" block in the flowchart shown in FIG. 5A.

FIG. 5B is a diagram illustrating the inputs to and the outputs from the "GROW-FRAGMENT" step of FIG. 5A. As shown in FIG. 5B, the "GROW-FRAGMENT" block 508 receives a user program and a root block as inputs 520. The "GROW-FRAGMENT" block 508 translates the user program to a system-level program as further described below. The resulting system-level program comprises a plurality of program fragments 522 which are the output of the "GROW-FRAGMENT" block 508. One of the program fragments 522 is referred to herein as a root fragment. The root fragment executes on the control node and controls the execution of the system-level program. The remaining program fragments 522 comprise a program fragment for each one of the remote nodes.

Figure 6A:
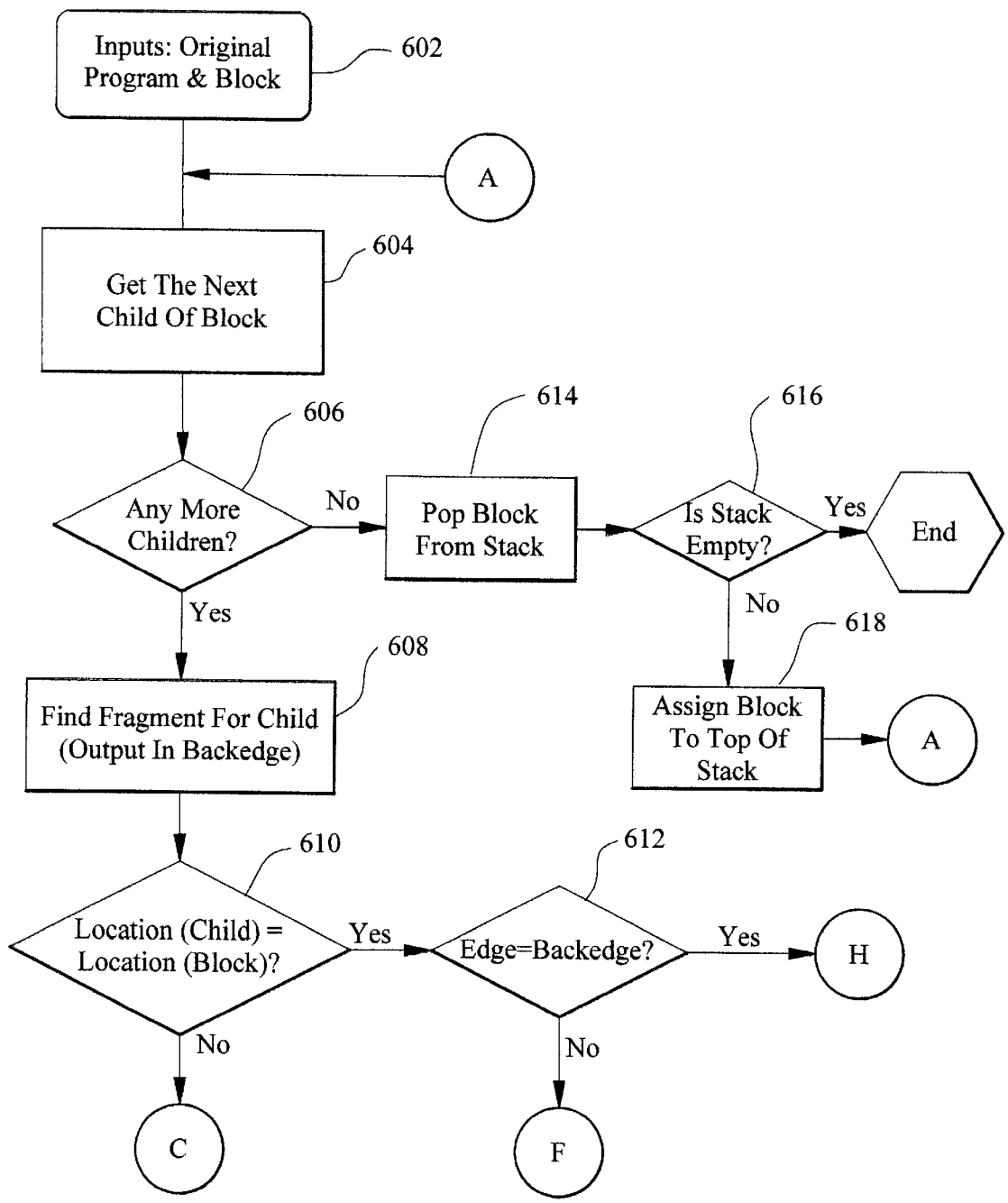
FIGS. 6A, 6B, 6C, 6D, and 6E are a more detailed flowchart for the "GROW_FRAGMENT" block of the flowchart in FIG. 5A.

FIGS. 6A, 6B, 6C, 6D, and 6E are a more detailed flowchart for the "GROW-FRAGMENT" step of FIG. 5A. The flowchart illustrates an example process for creating a program fragment for each one of the processing nodes. Referring now to FIG. 6A, the "GROW-FRAGMENT" block receives as inputs a user program and a block that is selected as the root block (box 602). The root block can be any program block that is located on the control node and the control node can be any one of the processing nodes.

The connections out of and into the block are examined to identify a next child of the root block (box 604). A connection between two program blocks is also referred to herein as an "edge." A "child" is a program block that is connected to the current block that is being processed by the "GROW-FRAGMENT" step. The child may be located on the same processing node as the block or the child may be located on a different processing node. If the next child of the root node exists (box 606), then the child is examined to determine if the child is already a part of a program fragment (box 610). If the child is already in a program fragment, then this connection is a backedge and indicates a cycle. In one embodiment, a variable (e.g. backedge) is set to indicate if the connection is a backedge or not. After determining if the child is already in a program fragment, the location of the child is compared to the location of the block to determine if the child and the block are located on the same processing node (box 610). If the child is on a different processing node, then the flowchart continues to FIG. 6B as indicated by the label "C". If the child is on the same processing node as the block, then the connection between the child and the block is checked to see if the connection is a backedge (box 612). If the connection is not a backedge, then the flowchart continues at "F" (box 660) of FIG. 6C. If the connection is a backedge, then the flowchart continues at "H" (box 680) of FIG. 6E.

If there is not a next child of the block (box 606), then a connection is traced backward to a previously identified block and the process in FIG. 6A is repeated. One of skill in the art will perceive that, in one embodiment, the method in FIGS. 6A–6E is implemented recursively. In an alternate embodiment, the method in FIGS. 6A–6E is implemented as an iterative program using a stack. However, alternate embodiments using additional or differing techniques are contemplated as within the scope of the invention. In this example embodiment, the method in FIGS. 6A–6E is implemented as an iterative program using a stack. An entry representing a previous block is popped off the stack (box 614). If the stack is empty (box 616), then method in FIGS. 6A–6E is completed. If the stack is not empty, then the entry at the top of the stack is assigned to block (box 618) and the process in FIG. 6A is repeated with the block.

Figure 6B:
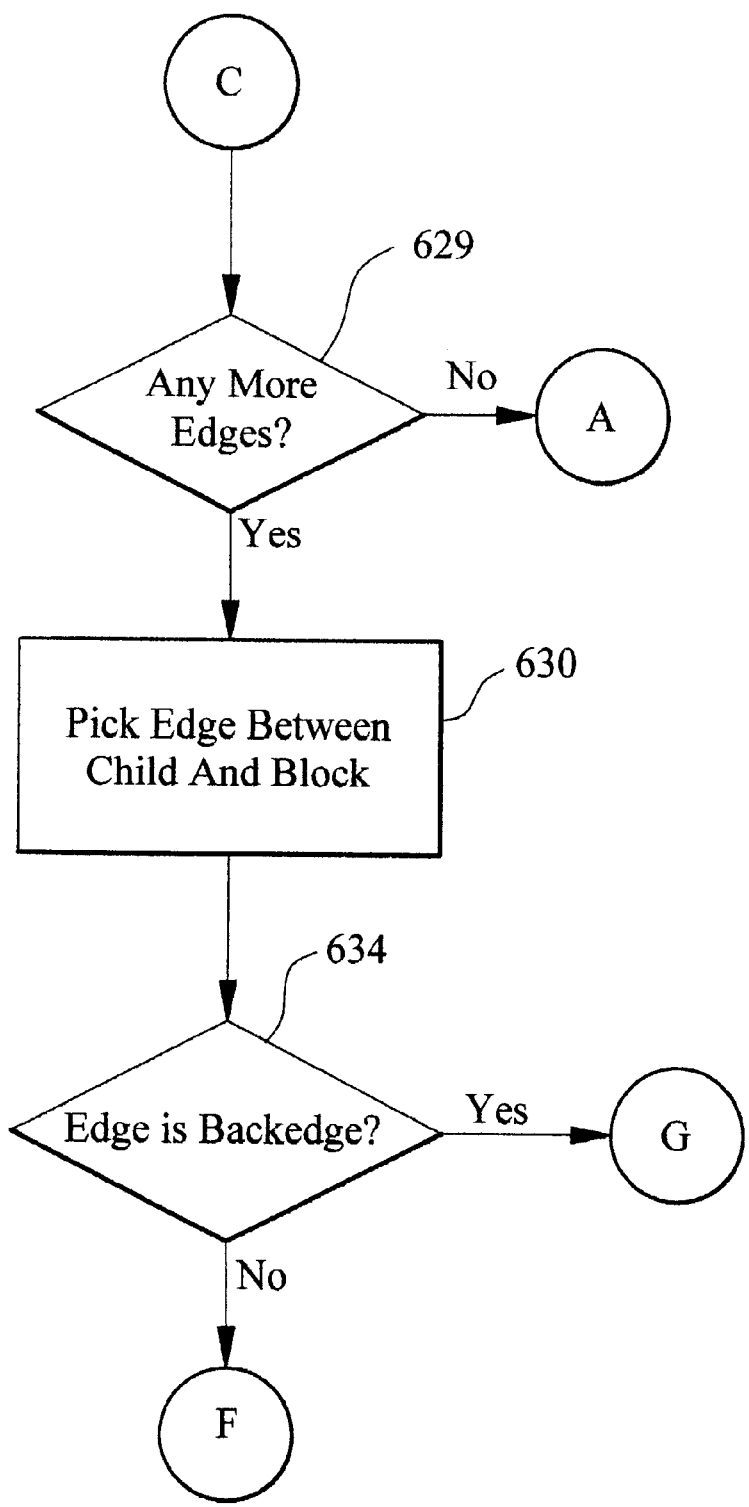

FIG. 6B illustrates a portion of one method of creating a program fragment for a child located on a different processing node than the block as indicated at "C" of FIG. 6A. The child and block are checked to see if there are multiple edges between them (box 629). If there is more than one edge between the block and the child, one of the edges is picked (box 630). When there are no more edges between the block and the child, then the process in FIG. 6A is repeated with the block. The edge is checked to determine if it is a backedge (box 634). If the connection is not a backedge, then the flowchart continues at "F" of FIG. 6C. If the connection is a backedge, then the flowchart continues at "G" of FIG. 6D.

Figure 6C:
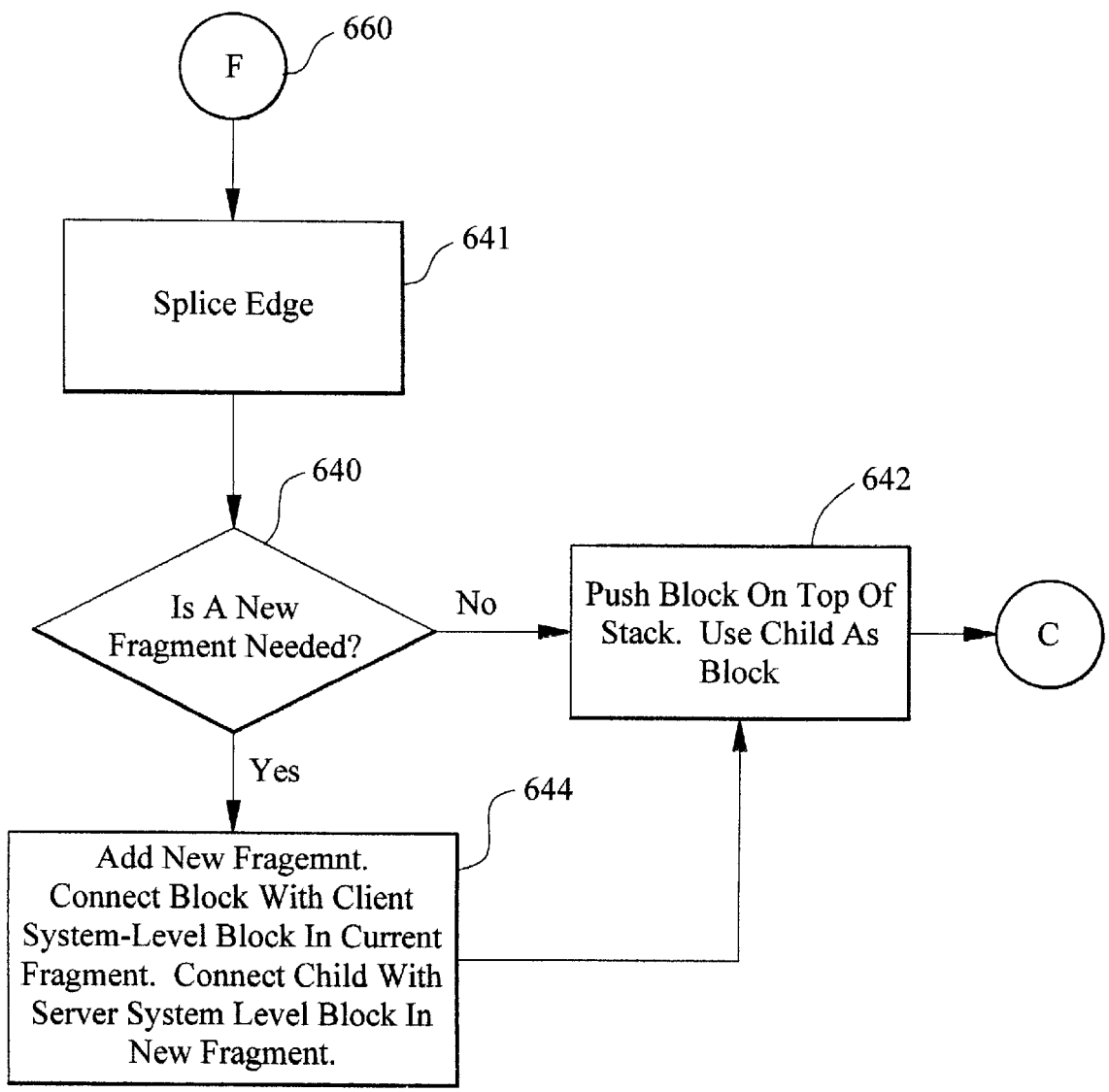

FIG. 6C illustrates the another portion of one method of creating a program fragment. The method illustrated in FIG.

6C applies when the connection between the child and the block is not a backedge. The edge is spliced (box 641) and the child is examined to determine if a new program fragment is needed for the child (box 640). If the child is already part of a program fragment, then a new fragment is not needed for the child. The block is pushed onto the stack and the child is used as the block (box 642). The process in FIG. 6B is repeated with the child as the block as indicated at "C". If the child is not a part of another program fragment, then a new program fragment is added (box 644). The block is connected with the client system-level block in the current fragment that the block exists in. The child is connected with the server system-level block in the new fragment. The block is pushed onto the stack and the child is used as the block. The process in FIG. 6B is repeated with the child as the block as indicated at "C".

Figure 6D:
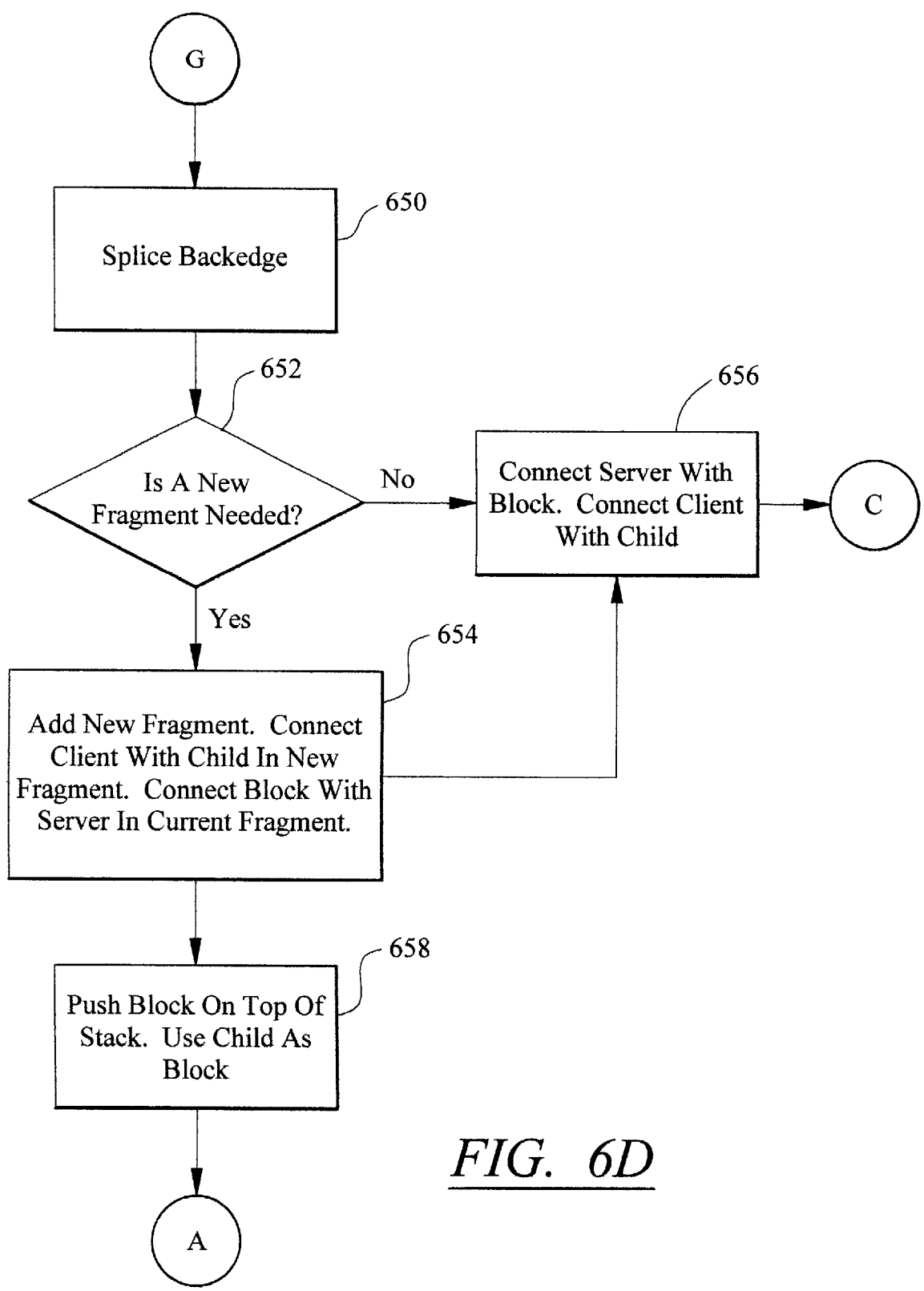

FIG. 6D illustrates another portion of one method of creating a program fragment for a child located on a different processing node than the block as indicated "G" of FIG. 6B. The method illustrated in FIG. 6D applies when the edge between the child and the block is a backedge. The backedge is spliced to prevent a cycle (box 650) and the child is examined to determine if the child is already a part of a program fragment (box 652). If the child is already part of a program fragment, then a server system-level block is connected with the block and a client system-level block is connected with the child (box 656). Then, the process in FIG. 6B is repeated for the block as indicated at "C". If the child is not part of a program fragment, then a new program fragment is added (box 654). The client system-level block is connected with the child in the new fragment and the server system-level block is connected with the block in the current fragment. Then the block is pushed onto the stack and the child is used as the block (box 658) and the process in FIG. 6A is repeated with the child as the block as indicated at "A".

Figure 6E:
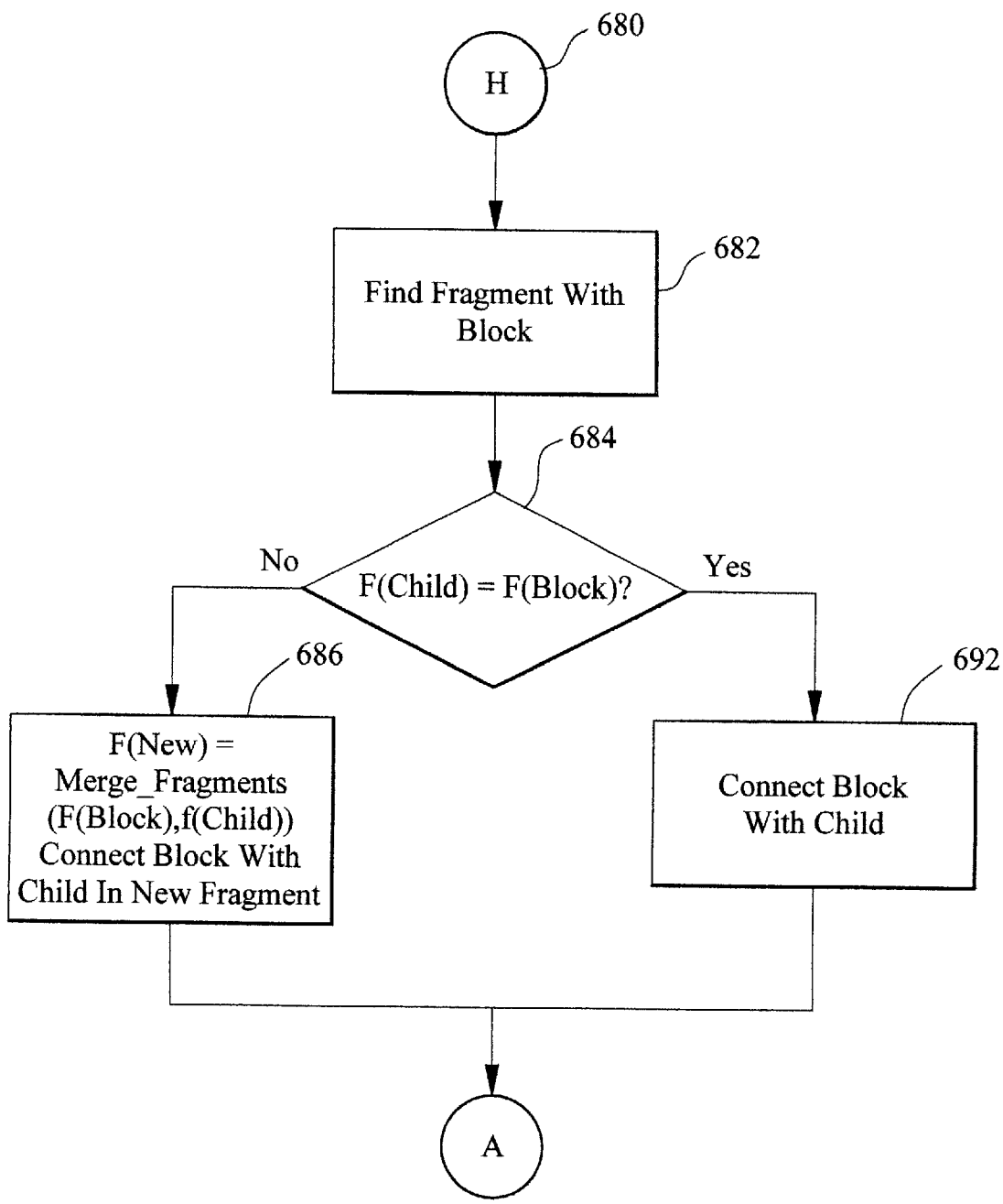

FIG. 6E illustrates another portion of one method of creating a program fragment for a child located on a the same processing node as the block as indicated in at "H" in FIG. 6A. The method illustrated in FIG. 6E applies when the edge between the child and the block is a backedge. A fragment is located which contains the block (box 682). The fragment for the child is compared to the fragment for the block to see if they are the same fragment (box 684). If the fragments are not the same, the child fragment and the block fragment are merged (box 686) and the block is connected to the child in the new fragment. Then the process in FIG. 6A is repeated as indicated by "A". If the fragments are the same, then the block is connected to the child (box 692). Then the process in FIG. 6A is repeated as indicated by "A".

The process for translating a user program to a system-level program shown in FIGS. 5A, 5B, 6A, 6B, 6D, and 6E offers several advantages. The process automatically creates program fragments and distributes the fragments throughout the network in a manner transparent to the user. The process automatically sets up network connections by inserting a pair of system-level client-server communications blocks between program blocks required to communicate across the network. The process is also capable of detecting and resolving feedback loops between program fragments and thus is capable of avoiding dead-lock and live-lock. Using methods shown in FIGS. 5A, 5B, 6A, 6B, 6D, 6E, and 6F, a cyclical program graph is translated into a acyclic "wait-for" graph thereby eliminating deadlocks.

Example Scenario. The process of constructing program fragments can be illustrated with an example scenario describing the data flow between the computing nodes. This scenario provides an example for illustrative purposes only.

Figure 7A:
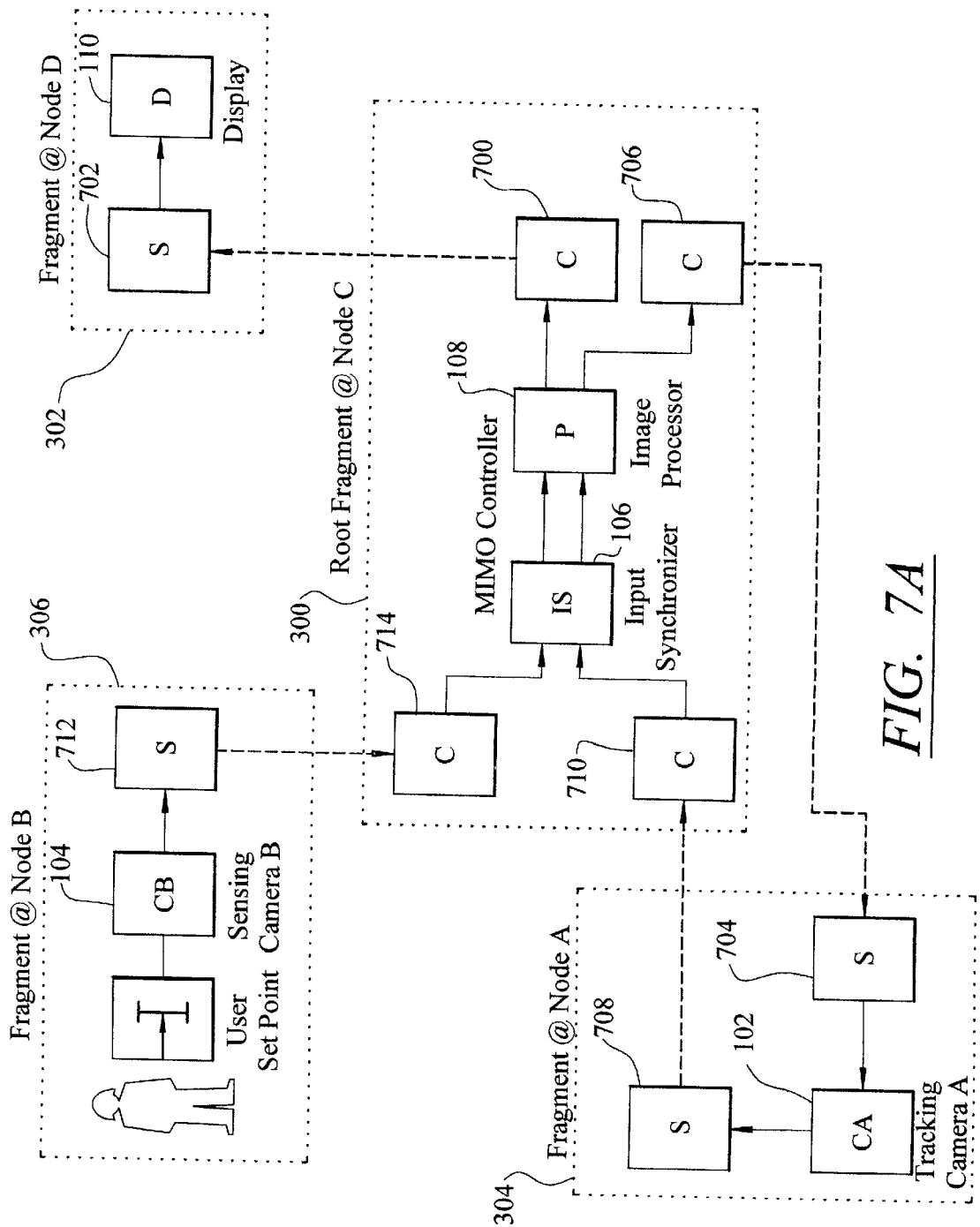
FIG. 7A is a functional block diagram of program fragments comprising the system-level program for the example logical construct shown in FIG. 1.

FIG. 7A is a functional block diagram of the program fragments for the application shown in FIG. 1. In the example scenario, the user program shown in FIG. 2 is submitted for execution on processing node C 300 of FIG. 7A. After the software identifies that the program blocks specified in the user program are distributed across computing nodes in the network, the software begins to build a program fragment for each one of the computing nodes having at least one program block specified in the user program. In this example embodiment, the software begins with the program blocks located on node C 300 because node C is the node where the user program was submitted for execution. The software identifies input synchronizer program block 106 which has two output ports. The output ports of program block 106 are connected to input ports of image processor program block 108. Because the image processor program block 108 and the input synchronizer program block 106 reside on the same node C 300, no communications blocks are required for information to pass between the program blocks 106, 108.

Image processor program block 108 has two output ports. One output port is connected to display program block 110 on node D 302. Because display program block 110 is located on a different computing node than image processor program block 108, the software must break the connection between image processor program block 108 and display program block 110 and insert communications blocks 700, 702. As described earlier, communications blocks are inserted into the system-level program in client-server pairs. First, the software adds an input server block 702 to the program fragment for node D 302. The input server block 702 is coupled to the display program block 110. Then the software adds an output client block 700 to the program fragment on node C 300. The output client block 700 is coupled to the image processor program block 108. Next, the software connects an output port of the output client block 700 on node C 300 to an input port of the input server block 702 on node D 302.

Next, the software identifies that an input port of the camera A program block 102 on node A 304 is connected to an output port of image processor program block 108 on node C 300. Because camera A program block 102 is located on a different computing node than image processor program block 108, the software must break the connection between image processor program block 108 and camera A program block 102 and insert communications blocks 704, 706. First, the software adds an input server block 704 to the program fragment for node A 304. The input server block 704 is coupled to the camera A program block 102. Then the software adds an output client block 706 to the program fragment on node C 300. The output client block 706 is coupled to the image processor program block 108. Next, the software connects the output port of an output client block 706 on node C 300 to an input port of the input server block 704 on node D 302.

Then, the software identifies that an output port of the camera A program block 102 on node A 304 is connected to an input port of input synchronizer program block 106 on node C 300. Because camera A program block 102 is located on a different computing node than input synchronizer program block 106, the software must break the connection between input synchronizer program block 106 and camera A program block 102 and insert communications blocks 708, 710. First, the software adds an output server block 708 to the program fragment for node A 304. The output server block 708 is coupled to the camera A program block 102. Then the software adds an input client block 710 to the program fragment on node C 300. The input client block 710 is coupled to the input synchronizer program block 106.

The software identifies the connection between camera A program block 102, input synchronizer block 106, image processor program block 108 and returning to camera A program block 102 as a feed back loop. Rather than continuing to follow the connections between these applications infinitely, the software identifies the connection between image processor program block 108 and camera A program block 102 (and the associated communications blocks 706, 704) as a back edge and does not continue to follow the loop. A back edge is identified when, in processing a new edge, the new edge leads to a node that has already been fragmented/processed. Rather, the software looks for other connections to image processor program block 108. After the software establishes the connections for all of the input and output ports of image processor program block 108, the software returns to input synchronizer program block 106. Input synchronizer program block 106 has two input ports. One of the input ports is coupled to input client block 710 as described above. The other input port of the Input synchronizer program block 106 is connected to an output port of camera B program block 104 on node B 306. Because camera B program block 104 is located on a different computing node than input synchronizer program block 106, the software must break the connection between input synchronizer program block 106 and camera B program block 104 and insert communications blocks 712, 714. First, the software adds an output server block 712 to the program fragment for node B 306. The output server block 712 is coupled to the camera B program block 104. Then the software adds an input client block 714 to the program fragment on node C 300. The input client block 714 is coupled to the input synchronizer program block 106. Next, the software connects the input port of input client block 714 on node C 300 to an output port of the output server block 712 on node B 306.

Figure 7B:
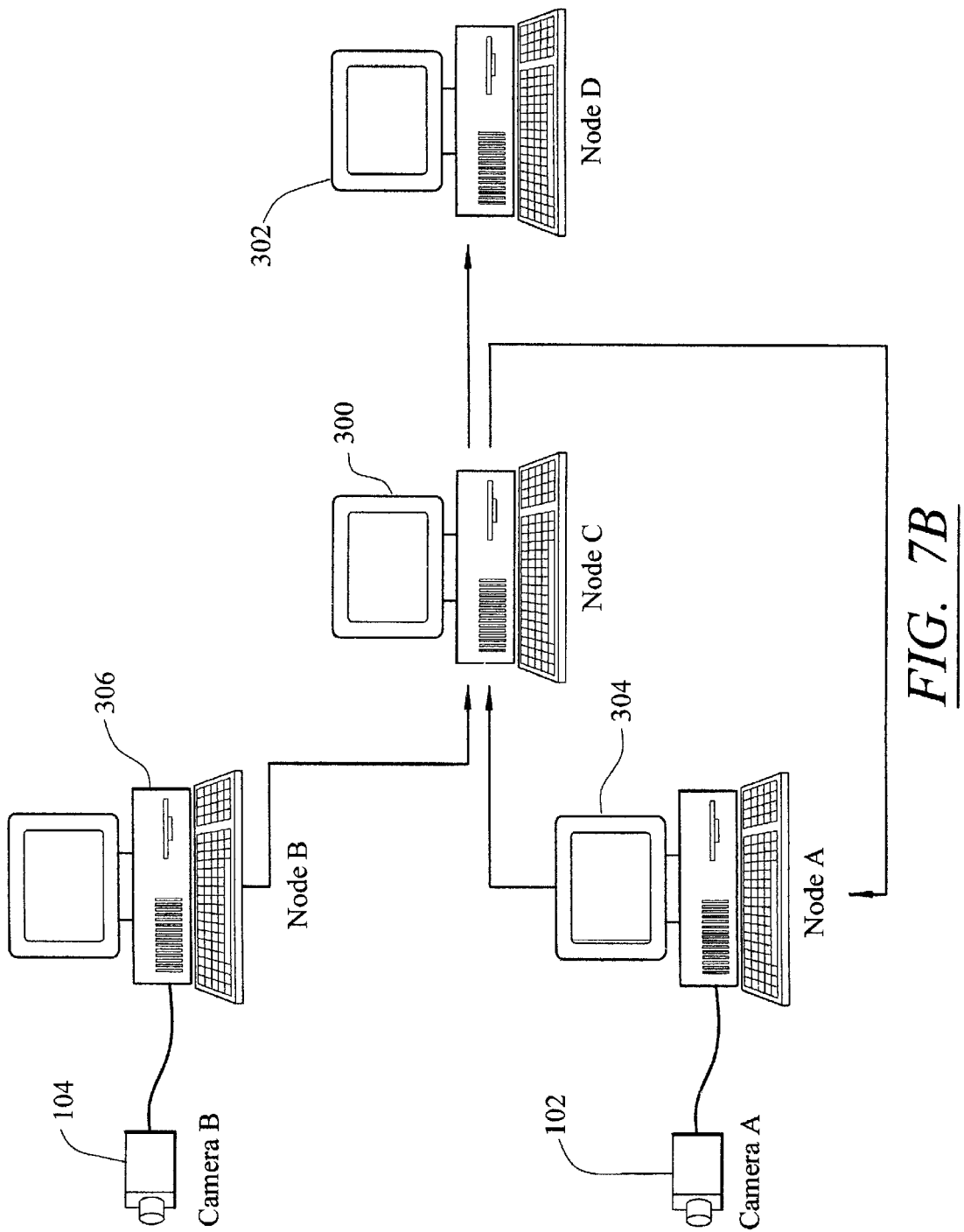
FIG. 7B is a physical diagram of an example network on which the program fragments of FIG. 7A execute.

FIG. 7B is a physical diagram of an example network on which the program fragments of FIG. 7A execute.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method comprising:
   receiving a user program specifying interconnections between a plurality of program blocks distributed across a plurality of processing nodes; and
   translating the user program into a system-level program having a program fragment for each of the processing nodes wherein the program fragment comprises the program blocks located on the processing node and one or more system-level blocks for establishing connections between the processing node and a different processing node across a network and detecting connections between program blocks that form a feedback loop in the program.

2. The method of claim 1, wherein at least one of the program blocks operates on multimedia data.

3. A method comprising:
   receiving a user program specifying interconnections between a plurality of program blocks distributed across a plurality of processing nodes; and
   translating the user program into a system-level program having a program fragment for each of the processing nodes wherein the program fragment comprises the program blocks located on the processing node and one or more system-level blocks for establishing connections between the processing node and a different processing node across a network, wherein at least one of the system level blocks represents networking functions performed within the computer.

4. The method of claim 3, wherein the networking functions establish connections between program blocks located on different processing nodes.

5. The method of claim 3, wherein the networking functions facilitate data transfer between program blocks located on different processing nodes.

6. A method of creating distributed block-based programs fragments, the method comprising the steps of:
   receiving a program specifying interconnections between a plurality of program blocks distributed across a plurality of processing nodes;
   designating one of the processing nodes as a root processing node wherein the root processing node is the processing node controlling execution of the program;
   tracing connections from each one of the program blocks on the root processing node;
   detecting connections between program blocks on the root processing node and program blocks on a remote processing node;
   inserting system-level blocks into the program to establish network connection between the root processing node and the remote processing node; and
   creating a program fragment for each one of the processing nodes wherein the program fragment comprises the program blocks and the system-level blocks located on the processing node.

7. The method of claim 6, further comprising detecting connections between the program blocks that form a feedback loop in the program.

8. The method of claim 6, wherein inserting system-level blocks further comprises inserting a first system-level block on the root processing node and inserting a second system-level block on the remote processing node.

9. The method of claim 8, wherein the system-level blocks are inserted in a client/server configuration.

10. A method of claim 6, wherein the root processing node is the processing node on which the program is submitted for execution.

11. The method of claim 6, wherein at least one of the program blocks represents functions performed by a sensor.

12. The method of claim 6, wherein at least one of the program blocks represents functions performed by an actuator.

13. The method of claim 6, wherein at least one of the program blocks operates on multimedia data.

14. A computerized system for creating distributed block-based programs fragments, the computerized system comprising:
   a means for receiving a user program specifying connections between a plurality of program blocks wherein the program blocks are distributed across a plurality of processing nodes; and
   a means for translating the user program to a system-level program, wherein the means for translating performs the steps of:
      identifying at least one program block located on a root processing node, wherein the root processing node is controlling execution of the program;

tracing the input and output connections from each one of the program blocks located on the processing node controlling executing of the program;

identifying a connection between one of the program blocks located on the root processing node and one of the program blocks located on a remote processing node;

inserting a first system-level block on the root processing node;

inserting a second system-level block on the remote processing node wherein the first and second system-level blocks provide network services; and creating a program fragment for the processing nodes, wherein the program fragment for each processing node comprises the program blocks and the system-level blocks located on the processing node.

15. The computerized system of claim 14, wherein at least one of the program blocks represents a means for producing data.

16. The computerized system of claim 14, wherein the data produced is multimedia data.

17. The computerized system of claim 14, wherein at least one of the program blocks represents a means for consuming data.

18. The computerized system of claim 17, wherein the data consumed is multimedia data.

19. The computerized system of claim 14, wherein at least one of the program blocks represents a means for processing data.

20. The computerized system of claim 19, wherein the data processed is multimedia data.

21. A computer comprising:

a memory;

a processor; and computer executable instructions executed by the processor from the memory for performing a method comprising:

receiving a user program specifying interconnections between a plurality of programs blocks distributed across a plurality of processing nodes: and translating the user program into system-level program having a program fragment for echo one of the processing nodes wherein the program fragment comprises the program blocks located on the processing node and one or more system-level blocks for establishing connections between the processing node and a different processing node across a network;

said computer executable instructions comprising detecting connections between program blocks that form a feedback loop in the program.

22. The computer of claim 21, wherein at least one of the program blocks operates on multimedia data.

23. A computer-readable medium having stored thereon a data structure, comprising:

an input module for receiving a user program specifying connections between a plurality of program blocks;

a determination module for identifying if the program blocks are distributed across a plurality of processing nodes;

a fragment module for creating a program fragment for the processing nodes, wherein the program fragment for each processing node comprises the program blocks and system-level blocks located on the processing node;

a write fragment module for writing the program fragment to the associated processing node; and an execution module for executing a system-level program comprising the program fragments.

\* \* \* \* \*